United States Patent
Choi et al.

(10) Patent No.: US 8,553,779 B2
(45) Date of Patent: Oct. 8, 2013

(54) METHOD AND APPARATUS FOR ENCODING/DECODING MOTION VECTOR INFORMATION

(75) Inventors: Kwang-Pyo Choi, Anyang-si (KR); Yun-Je Oh, Suwon-si (KR); Young-Hun Joo, Yongin-si (KR); Byeung-Woo Jeon, Seongnam-si (KR); Bong-Soo Jung, Busan (KR)

(73) Assignees: Samsung Electronics Co., Ltd. (KR); Sungkyunkwan University Foundation for Corporate Collaboration (KR)

( * ) Notice: Subject to any disclaimer, the term of this patent is extended or adjusted under 35 U.S.C. 154(b) by 549 days.

(21) Appl. No.: 12/414,280

(22) Filed: Mar. 30, 2009

(65) Prior Publication Data

US 2009/0245376 A1 Oct. 1, 2009

(30) Foreign Application Priority Data

Mar. 28, 2008 (KR) .................. 10-2008-0029289
Jul. 29, 2008 (KR) .................. 10-2008-0074289

(51) Int. Cl.
*H04N 7/32* (2006.01)
(52) U.S. Cl.
USPC ............. 375/240.16; 375/240.12; 375/240.13
(58) Field of Classification Search
USPC ........................ 375/240.12–240.16
See application file for complete search history.

(56) References Cited

U.S. PATENT DOCUMENTS

| 8,155,191 | B2 | 4/2012 | Lu et al. | |
|---|---|---|---|---|
| 2005/0135484 | A1* | 6/2005 | Lee et al. | 375/240.16 |
| 2007/0086523 | A1* | 4/2007 | Yan | 375/240.13 |
| 2007/0140344 | A1* | 6/2007 | Shima | 375/240.16 |
| 2008/0049837 | A1 | 2/2008 | Tanaka et al. | |
| 2008/0117976 | A1 | 5/2008 | Lu et al. | |
| 2009/0232217 | A1* | 9/2009 | Lee et al. | 375/240.16 |
| 2009/0310682 | A1* | 12/2009 | Chono | 375/240.16 |

FOREIGN PATENT DOCUMENTS

| JP | 2005-348093 | 12/2005 |
|---|---|---|
| JP | 2007-524279 | 8/2007 |
| JP | 2008-514121 | 5/2008 |
| JP | 2008-519503 | 6/2008 |
| WO | WO 2005/004491 | 1/2005 |

OTHER PUBLICATIONS

Machine translation of Korean application No. 10-2008-0024367.*
Yu-Kuang Tu et al., "Fast Variable-Size Block Motion Estimation for Efficient H.264/AVC Encoding", Signal Processing: Image Communication, vol. 20, Issue 7, Aug. 2005.

* cited by examiner

*Primary Examiner* — Christopher S Kelley
*Assistant Examiner* — Mohammed Jebari
(74) *Attorney, Agent, or Firm* — The Farrell Law Firm, P.C.

(57) ABSTRACT

A method and apparatus for encoding/decoding motion vector information are provided, in which a coding unit is divided into a plurality of subunits, PMVs of the subunits are calculated, it is determined whether the PMVs satisfy a predetermined condition, and coded motion vector data are generated, which include information indicating an omission of the motion vectors of the subunits, if the PMVs satisfy the predetermined condition.

10 Claims, 8 Drawing Sheets

METHOD AND APPARATUS FOR ENCODING/DECODING MOTION VECTOR INFORMATION

PRIORITY

This application claims priority under 35 U.S.C. §119(a) to a Korean Patent Application filed in the Korean Intellectual Property Office on Mar. 28, 2008 and assigned Serial No. 10-2008-0029289 and a Korean Patent Application filed in the Korean Intellectual Property Office on Jul. 29, 2008 and assigned Serial No. 10-2008-0074289, the entire disclosure of each of which is hereby incorporated by reference.

BACKGROUND OF THE INVENTION

1. Field of the Invention

The present invention generally relates to a video coding method. More particularly, the present invention relates to a video coding method for improving the compression rate of motion vector information.

2. Description of the Related Art

The standard H.264/AVC that has recently been completed promises excellent rate-distortion performance, using a block coding scheme like other conventional video compression standards. H.264/AVC divides a coding unit, macro block into a plurality of subunits of a variable block size and performs motion compensation by predicting the motion vectors of the divided blocks.

Motion vectors of a macro block being a coding unit are predicted and compensated in an inter-mode, SKIP, P16×16, P16×8, P8×16, or P8×8 (P8×8, P8×4, P4×8, or P4×4). With this variable block size-motion compensation technique, a maximum of 16 motion vectors are generated for a single macro block in H.264/AVC. This means that a large number of bits are required for encoding motion vector information. The size of subunits that are divided from a macro block is decided for variable block size-motion prediction, comprehensively considering positive effects that subunit-based fine motion compensation brings and negative effects from the bit overhead of transmitting additional information about a plurality of motion vectors and coding unit segmentation information indicating how a given coding unit is segmented into subunits, each being a motion compensation unit.

In the case of variable block size-segmentation, as a coding unit is divided into more subunits, less residual data is generated after motion compensation. However, since motion vectors are created according to the number of the divided subunits, the number of motion vectors increases. Despite the decrease of residual data to be encoded, the increase of motion vectors in number leads to an increase in the number of required bits. Consequently, the effects of motion compensation on a subunit basis are not successfully exerted.

SUMMARY OF THE INVENTION

An aspect of an embodiment of the present invention is to address at least the problems and/or disadvantages described above and to provide at least the advantages described below. Accordingly, an aspect of an embodiment of the present invention is to provide an encoding/decoding method and apparatus for effectively compressing information indicating the motion vectors of a coding unit and residual data of the coding unit.

In accordance with an aspect of an embodiment of the present invention, there is provided a method for encoding motion vector information about a coding unit, in which the coding unit is divided into a plurality of subunits, Predictive Motion Vector (PMVs) of the subunits are calculated, determining whether the PMVs satisfy a predetermined condition, and coded motion vector data are generated, which include information indicating an omission of the motion vectors of the subunits, if the PMVs satisfy the predetermined condition.

It is preferred that the motion vector information encoding method further includes estimating motion vectors in each of a plurality of Motion Vector Predicted Modes (MVPMs), recovering video information of the coding unit by applying the estimated motion vectors to a reference picture, calculating residual data between the recovered video information and original video information of the coding unit and encoding and decoding the residual data, generating re-recovered video information by applying the encoded and decoded residual data to the recovered video information, calculating a cost between the re-recovered video information and the original video information, selecting an MVPM with a minimum cost and setting the minimum cost as a first cost, and recovering the video information of the coding unit by applying the PMVs to the reference picture and calculating a second cost between the recovered video information and the original video information, and the predetermined condition is that the second cost is less than the first cost.

If the predetermined condition is not satisfied, coded motion vector data are generated, which include PMVs created for the MVPM with the minimum cost, generating information about the reference picture, and the generating residual data.

The predetermined condition can be that the PMVs of the subunits are equal to motion vectors of the subunits, or that reference pictures for the motion vectors of the subunits are identical.

The reference picture can be a picture neighboring a current picture being encoded or one selected from pictures stored in a frame memory. In the latter case, it is preferred that the coded motion vector data includes information indicating the reference picture.

For the PMV calculation, motion vectors of neighboring subunits are acquired for each subunit, and the PMV of each subunit is calculated by calculating a median value of the motion vectors of the neighboring subunits.

In accordance with another aspect of an embodiment of the present invention, there is provided a method for recovering motion vector information from a bit stream including an ID indicating a motion vector acquisition unit, in which the bit stream is parsed, a Motion Vector Coding Mode (MVCM) is acquired from the ID, PMVs are calculated and information about a reference picture is acquired according to a preset condition with an encoder, if the MVCM indicates a subunit-based motion vector skip mode, and motion compensation blocks are recovered by applying the PMVs to the reference picture.

If the MVCM does not indicate the subunit-based motion vector skip mode, coded motion vectors and coded residual data are recovered, information about a reference picture is checked, and video information of a coding unit is recovered by applying the motion vectors and the residual data to the reference picture.

For the PMV calculation, motion vectors of neighboring subunits are acquired for each subunit, a median value of the motion vectors of the neighboring subunits is calculated, and the median value is set as the PMV of each subunit The reference picture can be a picture neighboring to a current picture being encoded, in time.

In accordance with a further aspect of an embodiment of the present invention, there is provided an apparatus for encoding motion vector information about a coding unit using a motion estimator and a motion compensator, in which a controller commands detection of motion vectors and calculation of PMVs of subunits in a plurality of Motion Vector Predicted Modes (MVPMs), calculates costs of a recovered coding unit, and controls operations of the motion estimator and the motion compensator, the motion estimator detects the motion vectors of the subunits in the MVPMs, provides the motion vectors to the motion compensator, calculates the PMVs of the subunits based on motion vectors of neighboring subunits, and provides the PMVs to the motion compensator, and the motion compensator recovers video information of the coding unit by applying the received motion vectors to a reference picture. If the PMVs satisfy a predetermined condition, the controller includes information indicating omission of the motion vectors of the subunits in coded motion vector data.

It is preferred that if the predetermined condition is not satisfied, the controller includes information indicating an MVPM with a minimum cost, motion vectors detected in the MVPM with the minimum cost, and residual data in the coded motion vector data.

The predetermined condition can be that a cost of the PMVs of the subunits is less than a minimum cost calculated for the MVPMs and the PMVs of the subunits are equal to the motion vectors of the subunits.

The predetermined condition can be that reference pictures for the motion vectors of the subunits are identical.

The reference picture can be a picture neighboring to a current picture being encoded, in time.

It is preferred that the reference picture is selected from pictures stored in a frame memory and the coded motion vector data includes information indicating the reference picture.

The motion vector information coding apparatus further include a residual data encoder for encoding residua data between original video information of the coding unit and the recovered video information of the coding unit, and a residual data decoder for decoding the coded residual data, and the controller calculates a cost using the number of bits of the coded residual data and a distortion received from the residual data decoder.

It is preferred that the motion estimator acquires motion vectors of neighboring subunits for each subunit, and calculates the PMV of each subunit by calculating a median value of the motion vectors of the neighboring subunits.

In accordance with still another aspect of an embodiment of the present invention, there is provided an apparatus for recovering motion vector information from a bit stream, in which a controller acquires an MVCM from a received bit stream and controlling recovery of motion vectors and video information of a coding unit according to the MVCM, a motion vector decoder recovers motion vector information including coded motion vectors and reference picture information according to the MVCM notified by the controller and a predetermined condition agreed with an encoder, a motion estimator calculates PMVs of subunits according to the MVCM notified by the controller and the predetermined condition, a motion compensator recovers video information by applying the motion vectors to a reference picture, a residual data decoder recovers coded residual data, and an adder adds the residual data received from the residual data decoder to the video information received from the motion compensator.

If the MVCM indicates a subunit-based motion vector skip mode, the controller controls the motion vector estimator and acquires the reference picture information according to the predetermined condition.

It is preferred that the motion vector estimator acquires motion vectors of neighboring subunits for each subunit, calculates a median value of the motion vectors of the neighboring subunits, and sets the median value as the PMV of each subunit.

The reference picture can be a picture neighboring to a current picture being encoded, in time.

It is preferred that if the MVCM does not indicate a subunit-based motion vector skip mode, the controller controls the motion vector decoder and the residual data decoder according to the predetermined condition, the motion vector decoder acquires the motion vectors and a reference picture from received data, and the residual data decoder acquires the residual data from the bit stream.

BRIEF DESCRIPTION OF THE DRAWINGS

The above and other objects, features and advantages of certain embodiments of the present invention will be more apparent from the following detailed description taken in conjunction with the accompanying drawings, in which.

Throughout the drawings, the same drawing reference numerals will be understood to refer to the same elements, features and structures.

DETAILED DESCRIPTION OF EXEMPLARY EMBODIMENTS

The matters defined in the description such as a detailed construction and elements are provided to assist in a comprehensive understanding of embodiments of the invention. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

Embodiments of the present invention provide a coding method and apparatus in the context of H.264/AVC. Therefore, a coding unit is referred to as a macro block of which the pixels of a picture are encoded in H.264/AVC.

A coding unit (e.g. a macro block) is divided into at least two subunits, each being a motion vector acquisition unit in accordance with the embodiments of the present invention. Further, a subunit can be composed of 16×8, 8×16, 8×8, 8×4, 4×8, or 4×4 pixels.

While as the video coding and decoding method according to the embodiments of the present invention comply with H.264/AVC, a macro block is used as a coding unit, and a subunit includes 16×8, 8×16, 8×8, 8×4, 4×8, or 4×4 pixels, by way of example, to which the present invention is not limited, it is to be understood that the present invention is applicable to various video coding and decoding schemes.

Figure 1:
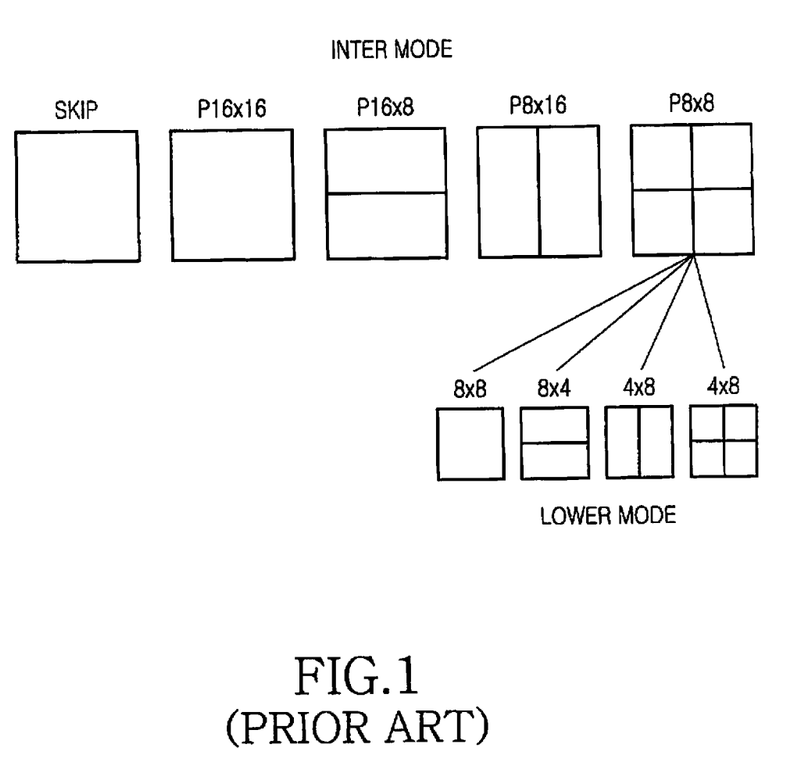
FIG. 1 illustrates Motion Vector Predictive Modes (MVPMs) defined in H.264/AVC.

In the embodiments of the present invention, a picture that is being coded is referred to as a Current Picture (CP) and a macro block that is being coded is a Current Macro Block (CMB). Modes in which motion vectors are predicted on a predetermined unit basis (e.g. a 16×16, 16×8, 8×16, 8×8, 8×4, 4×8, or 4×4 pixel unit) as illustrated in FIG. 1 is referred to as an Motion Vector Predicted Mode (MVPM). A predicted motion vector using the motion vectors of neighboring coding units (or subunits) is referred to as a Predictive Motion Vector (PMV), and a coding mode determined according to the motion vector information coding method of the present invention is referred to as a Motion Vector Coding Mode (MVCM).

In the process of video coding, a coding unit such as a macro block is divided into a predetermined number of sub-units and then motion compensation is performed on a sub-unit basis. Therefore, a motion vector is generated for each subunit.

Especially for a macro block corresponding to an area with little motion or a macro block corresponding to an area moving in the same direction, a considerable correlation may exist between a plurality of motion vectors.

In this context, the present invention clarifies the relationship between the motion vectors of neighboring macro blocks and those of a CMB and encodes only information indicating whether the relationship meets a predetermined condition. Hence, in video decoding, it is first determined whether the predetermined condition is met and the motion vectors of the macro block are recovered by applying the predetermined condition.

Figure 2:
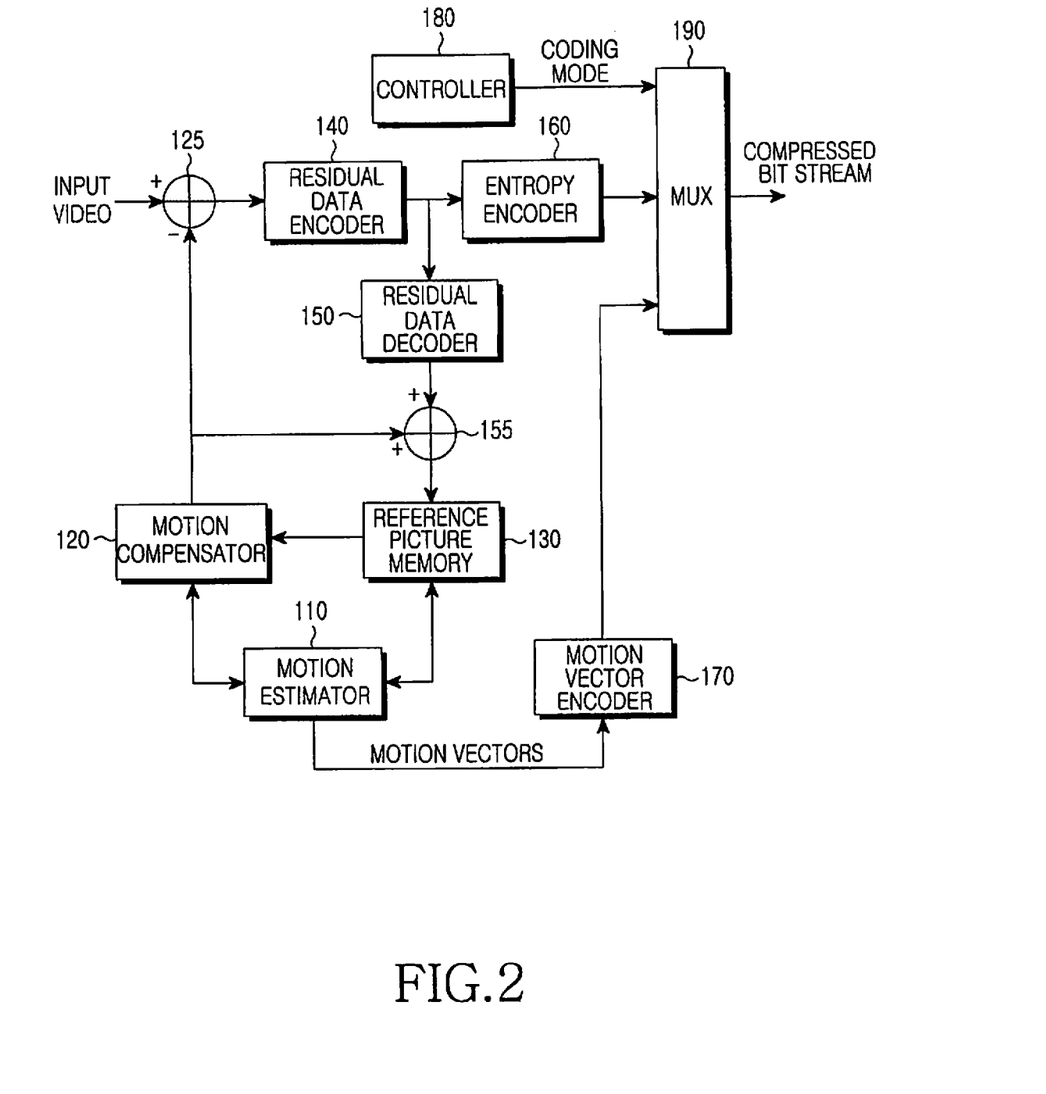
FIG. 2 is a block diagram of a video coding apparatus for encoding motion vector information according to an embodiment of the present invention.

FIG. 2 is a block diagram of a video coding apparatus for encoding motion vector information according to an embodiment of the present invention.

Referring to FIG. 2, the video coding apparatus includes a motion estimator 110, a motion compensator 120, a subtractor 125, a reference picture memory 130, a residual data encoder 140, a residual data decoder 150, an adder 155, an entropy encoder 160, a motion vector encoder 170, a controller 180, and a Multiplexer (MUX) 190.

The controller 180 notifies the motion estimator 110 of one of the MVPMs illustrated in FIG. 1. The motion estimator 110 detects motion vectors on the basis of a subunit corresponding to the notified MVPM (e.g., a 16×16, 16×8, 8×16 8×8, 8×4, 4×8, or 4×4 pixel unit), referring to at least one reference picture stored in the reference picture memory 130. Herein, the motion estimator 110 can receive information indicating a reference picture directly from the controller 180 and detect the motion vectors using the reference picture. Alternatively, the motion estimator 110 may receive only MVPM information from the controller 180, calculate the error values of pictures neighboring to a CP in time, and detect the motion vectors with respect to a reference picture with a minimum error value. The motion estimator 110 provides the motion vectors and the index of the reference picture. Also, the motion estimator 110 computes the PMV of each subunit under the control of the controller 180 and provides the PMVs to the motion compensator 120. For example, the controller 180 commands the motion estimator 110 to compute the PMVs of 8×8 pixel units and thus the motion estimator 110 computes the PMVs of the CMB on a 8×8 pixel unit basis.

While the motion estimator 110 is responsible for PMV computation an embodiment of the present invention, to which the present invention is not limited, it is further contemplated that the controller 180 or the motion vector encoder 170 takes charge of computing the PMVs.

The motion compensator 120 receives the motion vectors and the index of the reference picture from the motion estimator 110 and generates a macro block by applying the motion vectors to the reference picture.

If the input macro block is subject to inter-picture predictive coding, the subtractor 125 receives a macro block of the reference picture corresponding to the input macro block from the motion compensator 120 and generates residual data by subtraction between the input macro block and the macro block of the reference picture.

The residual data encoder 140 performs Discrete Cosine Transform (DCT) and quantization on the residual data, thus encoding the residual data. The residual data decoder 150 decodes the encoded residual data.

The adder 155 generates a recovered picture by combining the macro block recovered by the motion compensator 120 with the residual data received from the residual data decoder 150 and stores the recovered picture in the reference picture memory 130.

The entropy encoder 160 entropy-encodes the encoded residual data received from the residual data encoder 140. The motion vector encoder 170 encodes the motion vectors and the information about the reference picture for the motion vectors received from the motion estimator 110.

The controller 180 provides overall control to every function block. The controller 180 determines an MVCM by checking whether the motion vectors of a CMB meet a predetermined condition. That is, the controller 180 controls motion vector detection on the basis of a subunit corresponding to a MVPM illustrated in FIG. 1 and controls the operations of the motion estimator 110, the motion compensator 120, and the reference picture memory 130 in order to generate a motion-compensated picture based on the motion vectors.

Through this control, the controller 180 acquires data to be evaluated with respect to a predetermined condition. If the data meets the predetermined condition, the controller 180 notifies the MUX 190 of a mode indicating omission of motion vectors without providing the motion vector information to the MUX 190. The predetermined condition can be that a PMV-based cost is less than the cost of a minimum-cost MVPM. Hence, the controller 180 calculates the cost between the original picture of the CMB and the motion-compensated macro block as the data to be evaluated.

The MUX 190 multiplexes the entropy-coded residual data, MVCM information, and encoded motion vector information.

The video coding apparatus according to an embodiment of the present invention may further include an intra predictor and deblocking filter in compliance with H.264/AVC. Also, the residual data encoder 140 and the residual data decoder 150 may further perform DCT and quantization (inverse DCT and dequantization) on particular pictures (e.g. Intra Coded Pictures (I pictures) based on MPEG-2 or H.264 standard. Specifically, I Pictures include macroblocks coded without prediction.) as well as DCT and quantization of residual data based on H.264/AVC. Further, the video coding apparatus according to an embodiment of the present invention may further encode video data in H.264/AVC as well as encode motion vectors.

A method for encoding motion vector information according to the present invention will be described, focusing on the controller 180, the motion estimator 110, the motion compensator 120, and the reference picture memory 130.

Figure 3:
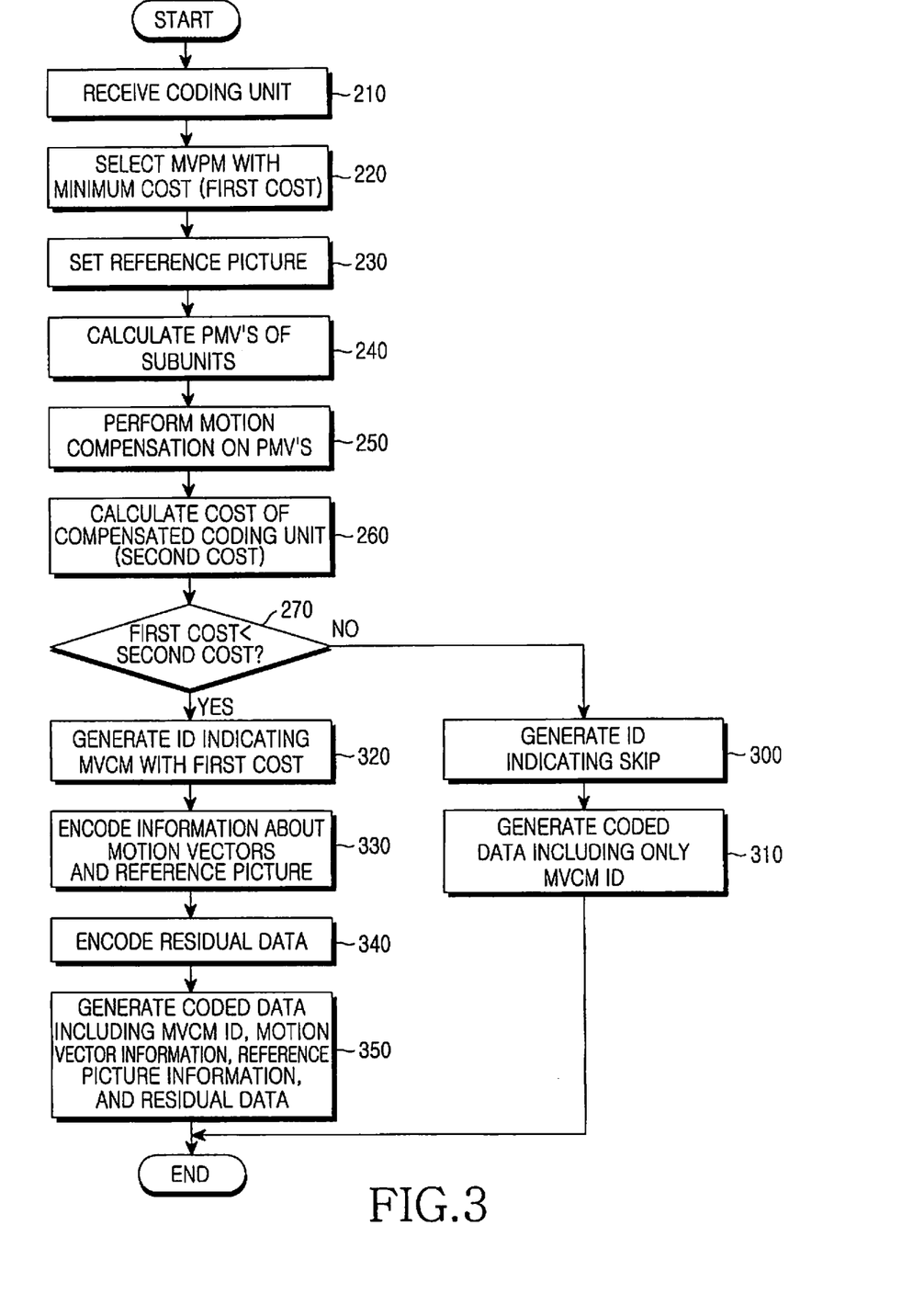
FIG. 3 is a flowchart illustrating a method for encoding motion vector information according to an embodiment of the present invention.

FIG. 3 is a flowchart illustrating a method for encoding motion vector information according to an embodiment of the present invention.

Referring to FIG. 3, a coding unit, i.e. a macro block, is received in step 210 and an MVPM with an optimal cost is selected for the macro block by prediction through motion estimation and motion compensation in step 220. The controller 180 sequentially indicates the MVPMs, SKIP, P16×16, P16×8, P8×16, or P8×8, P8×4, P4×8, and P4×4 illustrated in FIG. 1 to the motion estimator 110 and provides information indicating the stored location of a reference picture to be referred to for motion estimation to the motion estimator 110. At the same time, the controller 180 commands the motion estimator 110 to operate. The motion estimator 110 detects motion vectors in each MVPM and provides the MVPM, the estimated motion vectors, and the index of the reference picture to the motion compensator 120. The motion compensator 120 re-configures a macro block using the motion vectors and the reference picture. As the re-configured macro block is sequentially processed in the subtractor 125, the residual data encoder 140, and the residual data decoder 150, residual data is created. The adder 155 generates a recovered first macro block by combining the re-configured macro block with the residual data. Consequently, first macro blocks are generated for the respective modes of SKIP, P16×16, P16×8, P8×16, P8×8, P8×4, P4×8, and P4×4. The controller 180 computes the costs between the first macro blocks and the original macro block and sets the minimum of the costs as a first cost.

Then the controller 180 sets the reference picture to be used for the coding method of the present invention in step 230 and provides the index of the reference picture to the motion compensator 120.

Preferably, the reference picture can be the latest of pictures stored in the reference picture memory 130, for example, a picture with reference index 0.

Step 240 can be performed by the controller 180 and the motion estimator 110. The controller 180 commands the motion estimator 110 to compute the PMV of every subunit. The motion estimator 110 computes the PMVs of the subunits of the macro block, referring to neighboring subunits (e.g. 8×8 pixel blocks).

Figure 4:
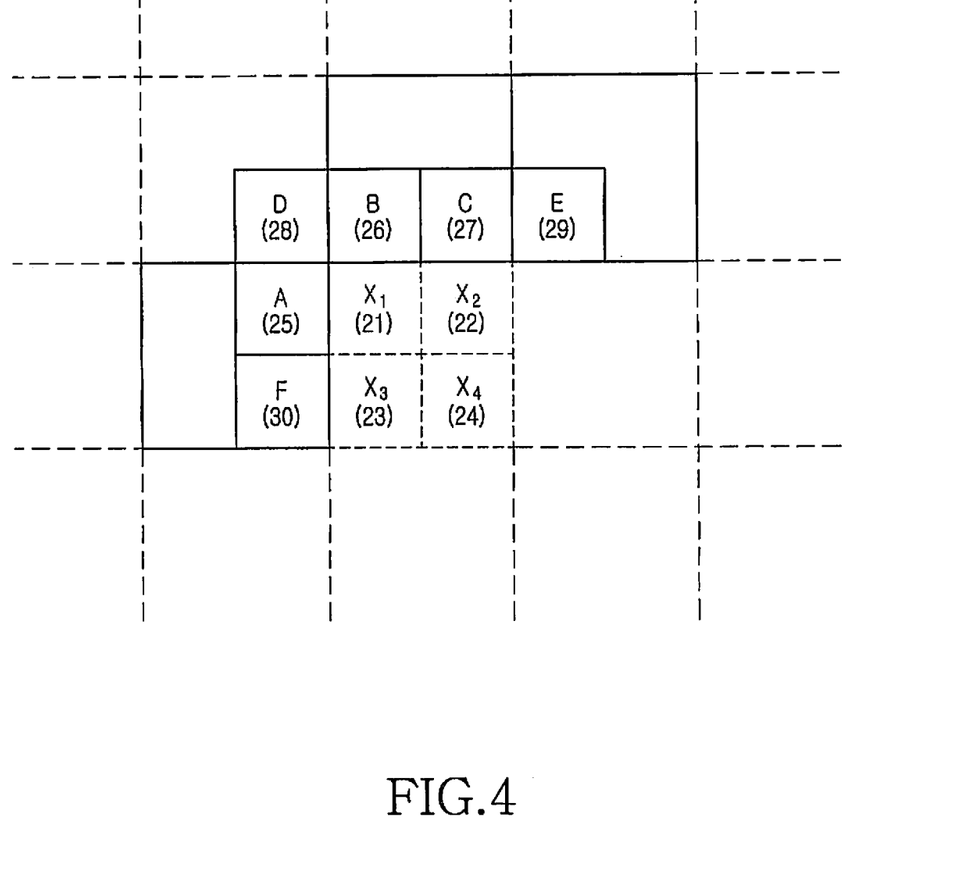
FIG. 4 illustrates a macro block subject to encoding of motion vector information according to an embodiment of the present invention.

For example, referring to FIG. 4, if the CMB includes four 8×8 subunits 21 to 24 ($X_1$, $X_2$, $X_3$ and $X_4$), the motion estimator 110 computes the PMVs of subunits $X_1$, $X_2$, $X_3$ and $X_4$. Let the motion vectors of neighboring subunits to a first block $X_1$, that is, a left block 25 (A), an upper block 26 (B), and an upper right block 27 (C) be denoted by $MV_A$, $MV_B$ and $MV_C$, respectively. The value of the PMV of the block $X_1$, $PMV_{X1}$ is computed by Equation (1). The PMV computation is performed independently with respect to vector components, i.e. x component and y component.

$$PMV_{X_1} = \text{median}(MV_A, MV_B, MV_C) \quad (1)$$

Neighboring blocks of a second subunit $X_2$ are a left block 21, $X_1$, an upper block 27 (C), and an upper right block 29 (E) and their motion vectors are denoted by $MV_{X1}$, $MV_C$ and $MV_E$, respectively. The value of the PMV of the block $X_2$, $PMV_{X2}$ is computed by Equation (2). In the same manner, the value of the PMV of the block $X_3$, $PMV_{X3}$ is computed by Equation (3).

$$PMV_{X_2} = \text{median}(MV_{X_1}, MV_C, MV_E) \quad (2)$$

$$PMV_{X_3} = \text{median}(MV_F, MV_{X_1}, MV_{X_2}) \quad (3)$$

While the motion estimator 110 computes the PMV of a current subunit using the motion vectors of neighboring blocks to the left, above, and to the upper right of the current subunit in an embodiment of the present invention, to which the present invention is not limited, it can be further contemplated that when the motion vector of an upper right block cannot be acquired as for the block $X_4$, the motion vector of an upper left block, i.e. block $X_1$, is used. In this case, the PMV of the block $X_4$, $PMV_{X4}$ is computed by Equation (4):

$$PMV_{X_4} = \text{median}(MV_{X_3}, MV_{X_2}, MV_{X_1}) \quad (4)$$

While the motion estimator 110 selects the median value of the motion vectors of neighboring subunits as the PMV of the current subunit in an embodiment of the present invention, to which the present invention is not limited, it can be further contemplated that the motion vector 110 predicts the motion vector of the current subunit in various manners including averaging, motion vector competition, etc.

The motion compensator 120 generates a second macro block using the PMVs, $PMV_{X1}$, $PMV_{X2}$, $PMV_{X3}$ and $PMV_{X4}$ received from the motion estimator 110 in step 250. The index of the reference picture required for motion compensation has been received from the controller 180.

The controller 180 calculates the cost between the second macro block and the original macro block as a second cost in step 260. The second cost is provided to the controller 180.

The controller 180 determines whether the predetermined condition is satisfied by comparing the first cost with the second cost in step 270. If the condition is satisfied, that is, the second cost is less than the first cost, the controller 180 determines the MVCM of the CMB to be extended SKIP and provides the ID of the determined MVCM (i.e. extended SKIP) to the MUX 190 without any particular motion vector information in step 300. Hence, the MUX 190 generates a coded stream including only an MVCM ID indicating extended SKIP in step 310.

Preferably, the predetermined condition can be that the PMVs of subunits are identical to their motion vectors. Hence, the coding method according to an embodiment of the present invention may further include step 280 for determining whether the PMVs of the subunits are identical to their motion vectors between steps 270 and 300 (refer to FIG. 5).

More preferably, the predetermined condition includes the above two conditions and it is that the reference pictures for the PMVs of the subunits are the same. Hence, the coding method according to an embodiment of the present invention may further include step 290 for determining whether the reference pictures for the PMVs of the subunits are identical between steps 280 and 300 (refer to FIG. 6).

Figure 5:
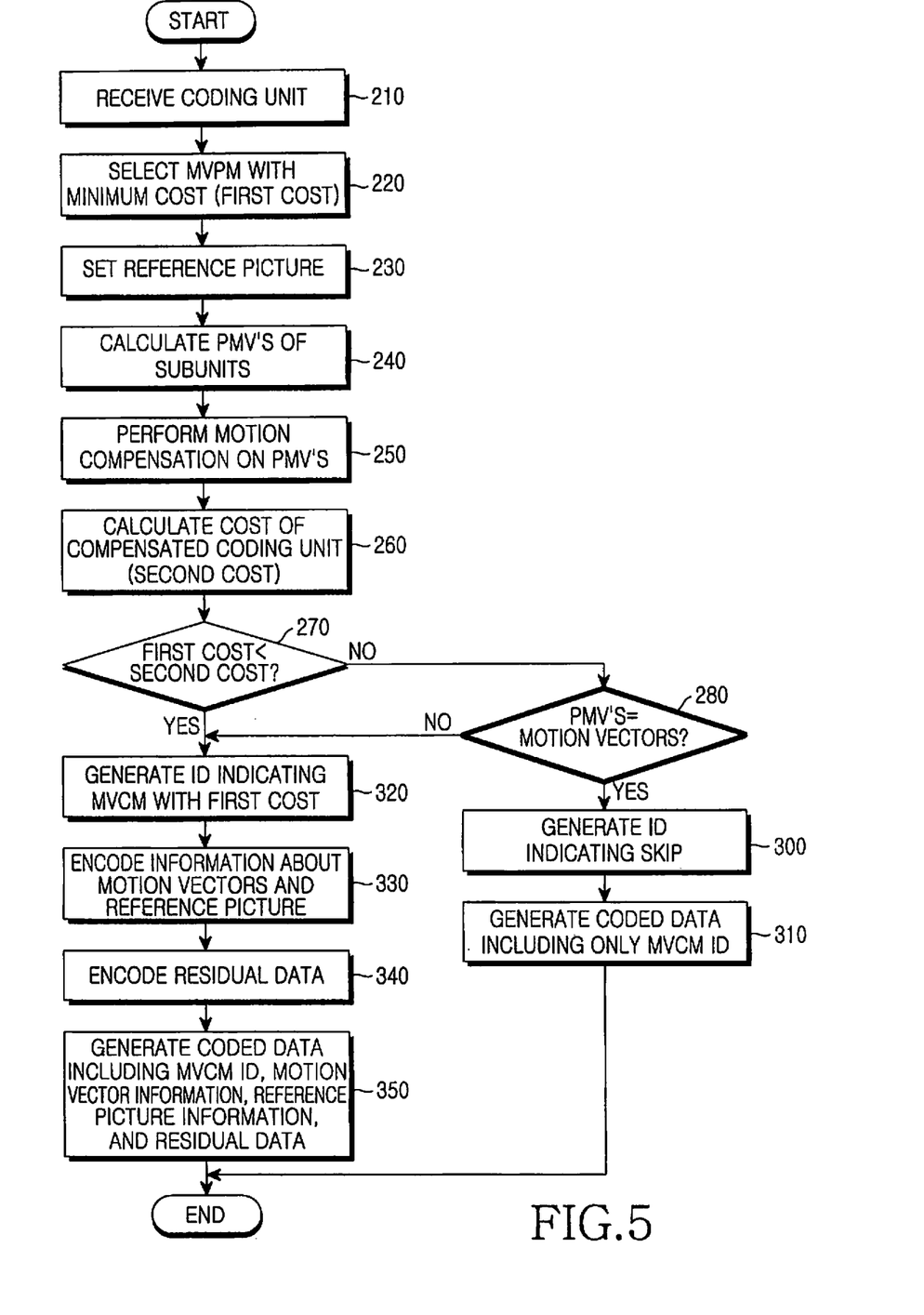
FIG. 5 is a flowchart illustrating a method for encoding motion vector information according to another embodiment of the present invention.
Figure 6:
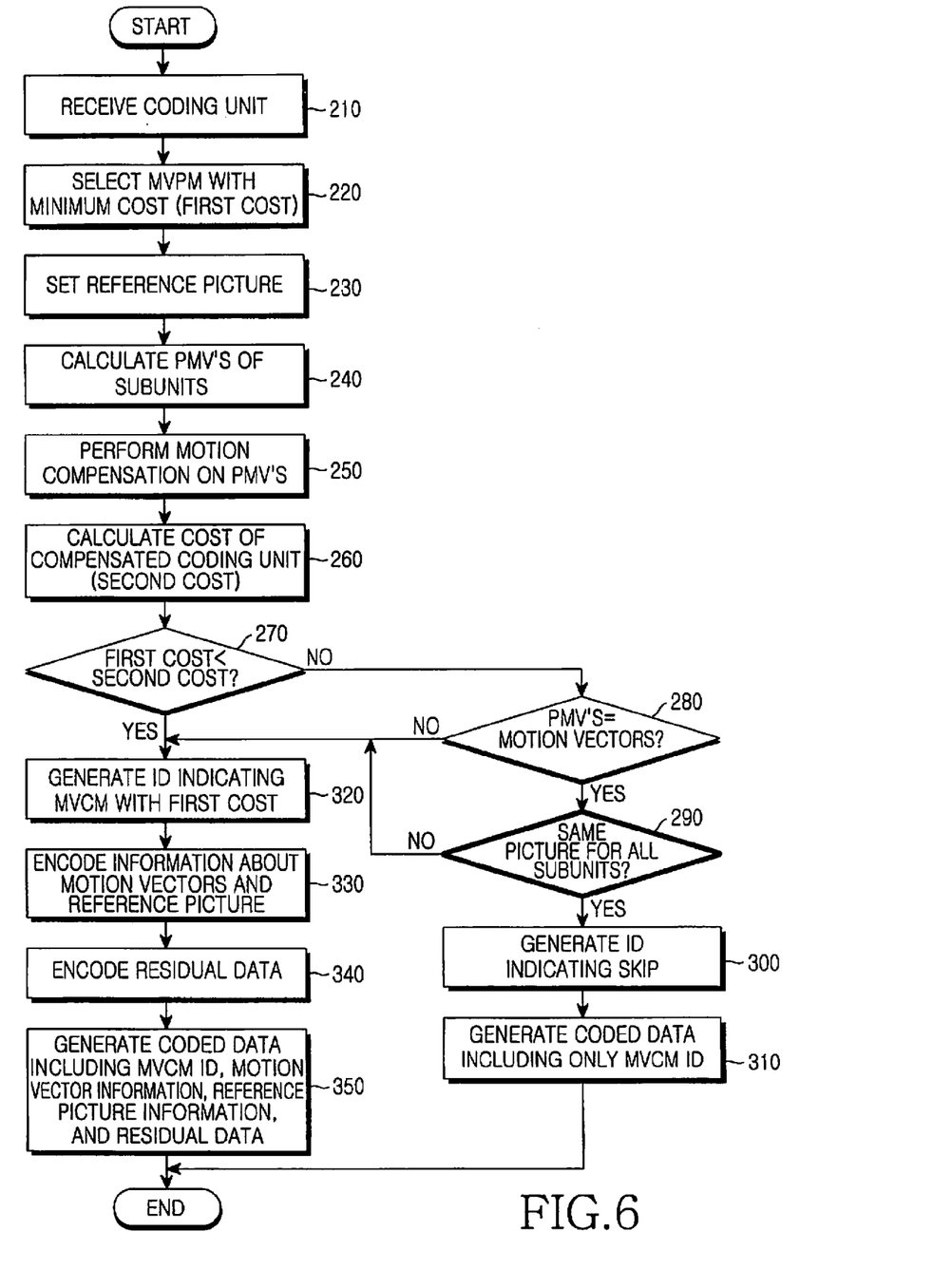
FIG. 6 is a flowchart illustrating a method for encoding motion vector information according to a third embodiment of the present invention.

The controller 180 may take charge of steps 280 and 290.

If the first cost is less than the second cost in step 270, the controller 180 determines the MVCM to be the MVPM corresponding to the first cost, considering that the predetermined condition is not satisfied and generates an ID indicating the MVCM in step 320.

In step 330, the controller 180 commands the motion vector encoder 170 to encode the motion vectors corresponding to the first cost and information about the reference picture of the motion vectors, simultaneously with outputting the ID of the MVCM to the MUX 190. Then the controller 180 commands the residual data encoder 140 to encode the residual data of the macro block recovered based on the motion vectors in step 340. Thus, the MUX 190 generates a coded stream by multiplexing the ID of the MVCM, the motion vectors, the information about the reference picture of the motion vectors, and the residual data in step 350. For instance, IDs identifying MVCMs can be defined as illustrated in Table 1.

TABLE 1

| mb_type | code | No. of bits | Name of mb_type |
|---------|------|-------------|-----------------|
| 0 | "1" | 1 | P16 × 16 |
| 1 | "010" | 3 | P8 × 8 Skip MV (extended SKIP) |
| 2 | "011" | 3 | P16 × 8 |
| 3 | "00100" | 5 | P8 × 16 |
| 4 | "00101" | 5 | P8 × 8 |
| 5 | "00110" | 5 | P8 × 8 ref0 |

If mb_type is "0", this indicates that there is data related to the coded motion vectors and the MVCM is P16×16. In this case, the controller 180 sets the ID of the MVCM to "1" in step 320 and generates a coded stream by combining the ID of the MVCM, the motion vectors, information about the reference picture of the motion vectors, and the residual data in steps 330, 340 and 350.

If mb_type is "2", this indicates that there is data related to the coded motion vectors and the MVCM is P16×8. In this case, the controller 180 sets the ID of the MVCM to "011" in step 320 and generates a coded stream by combining the ID of the MVCM, the motion vectors, information about the reference picture of the motion vectors, and the residual data in steps 330, 340 and 350.

If mb_type is "3", this indicates that there is data related to the coded motion vectors and the MVCM is P8×16. In this case, the controller 180 sets the ID of the MVCM to "00100" in step 320 and generates a coded stream by combining the ID of the MVCM, the motion vectors, information about the reference picture of the motion vectors, and the residual data in steps 330, 340 and 350.

If mb_type is "4", this indicates that there is data related to the coded motion vectors and the MVCM is P8×8. In this case, the controller 180 sets the ID of the MVCM to "00101" in step 320 and generates a coded stream by combining the ID of the MVCM, the motion vectors, information about the reference picture of the motion vectors, and the residual data in steps 330, 340 and 350.

If mb_type is "5", this indicates that there is data related to the coded motion vectors, the MVCM is P8×8, and the reference picture for the subunits of the macro block is the latest stored one (e.g. reference index 0). In this case, the controller 180 sets the ID of the MVCM to "00110" in step 320 and generates a coded stream by combining the ID of the MVCM, the motion vectors, and the residual data without information about the reference picture of the motion vectors in steps 330, 340 and 350.

Meanwhile, if mb_type is "1", this indicates P8×8 Skip (extended SKIP). In this case, the controller 180 sets the ID of the MVCM to "010" in step 320 and generates a coded stream including only the ID of the MVCM without encoding the motion vectors, information about the reference picture of the motion vectors, and the residual data in steps 330, 340 and 350.

In the P8×8 Skip(extended SKIP) mode, therefore, coding is done only with the ID of the 3-bit MVCM ID. However, motion vectors are set on a subunit basis, and they are recovered later in decoder accurately.

In accordance with the motion vector information coding method of the present invention, if the motion vectors of subunits satisfy a predetermined condition, the motion vectors can be indicated using a single MVCM without encoding information about the motion vectors. Therefore, the number of bits of motion vector information is minimized and the motion vectors can be recovered more accurately.

Figure 7:
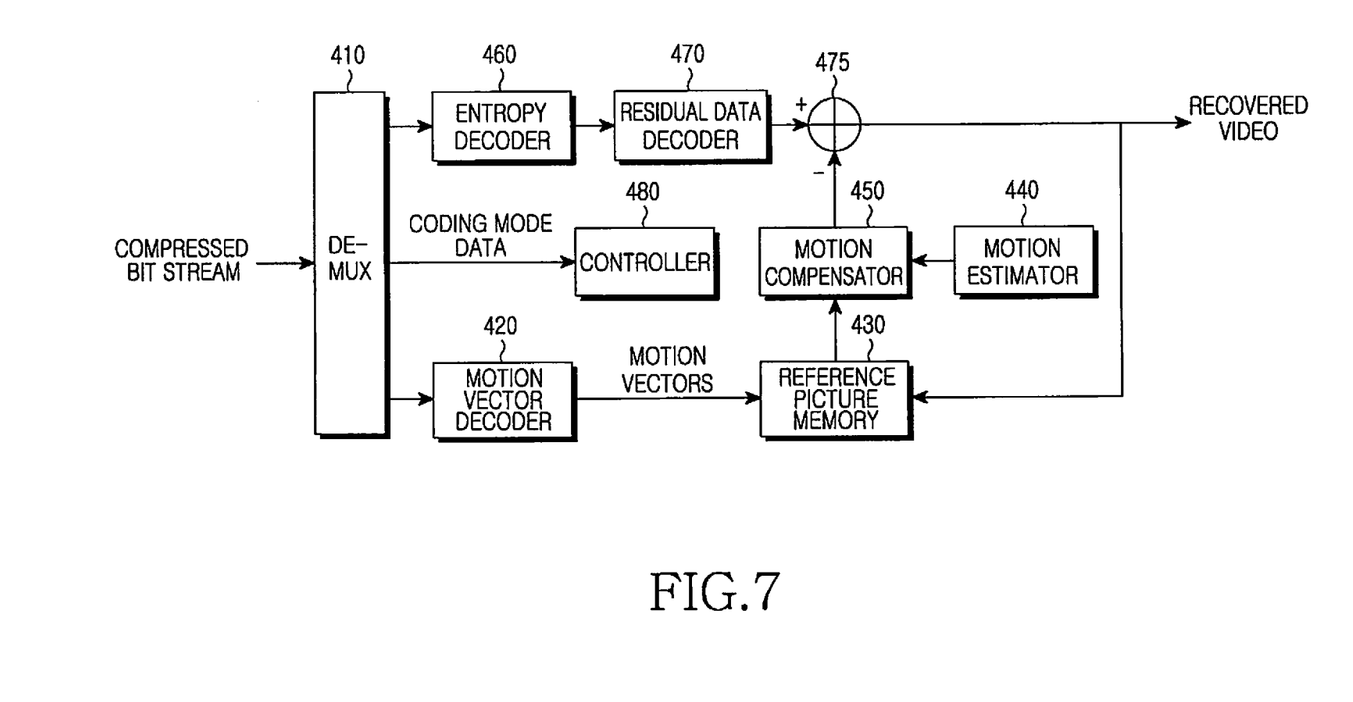
FIG. 7 is a block diagram of a video decoding apparatus for decoding motion vector information according to an embodiment of the present invention.

FIG. 7 is a block diagram of a video decoding apparatus for encoding motion vector information according to an embodiment of the present invention.

Referring to FIG. 7, the video decoding apparatus includes a Demultiplexer (DEMUX) 410, a motion vector decoder 420, a reference picture memory 430, a motion estimator 440, a motion compensator 450, an entropy decoder 460, a residual data decoder 470, an adder 475, and a controller 480.

The DEMUX 410 parses a coded bit stream, acquires the ID of an MVCM, and provides the MVCM ID to the controller 480. If the MVCM ID indicates extended SKIP, the DEMUX 410 does not acquire information about motion vectors. If the MVCM ID does not indicate extended SKIP, the DEMUX 410 acquires coded motion vectors, information about a reference picture of the motion vectors, and residual data from the coded bit stream. The DEMUX 410 provides the coded motion vectors and the reference picture information to the motion vector decoder 420 and the coded residual data to the entropy decoder 460.

The motion vector decoder 420 decodes the motion vectors and the reference picture information.

The motion estimator 440 calculates predicted motion vectors using neighboring motion vectors, preferably in the same manner as the predicted motion vector calculation method performed during encoding. For example, the predicted motion vectors can be computed by Equation (1) to Equation (4).

The motion compensator 450 is notified by the controller 480 of a motion vector recovery unit corresponding to the MVCM. The motion compensator 450 applies the motion vectors received from the motion vector decoder 420 to the reference picture, thereby recovering the video information of a coding unit.

The entropy decoder 460 generates quantized coefficients by entropy-decoding the coded residual data and the residual data decoder 470 recovers the residual data by dequantizing and inverse-transforming the quantized coefficients.

The adder 475 recovers final video information by reflecting the recovered residual data in the video information recovered through the motion compensation.

The controller 480 provides overall control to every function block and thus controls all of the operations of the video decoding apparatus. The controller 480 receives the ID of an MVCM from the DEMUX 410 and determines whether the MVCM ID indicates extended SKIP.

If the MVCM indicates extended SKIP, the controller 480 controls recovery of video information by providing the index of a reference picture and motion vectors to the motion compensator 450 according to a predetermined condition.

If the MVCM does not indicate extended SKIP, the controller 480 controls the DEMUX 410 to provide motion vectors based on the MVCM and information about the reference picture of the motion vectors to the motion decoder 420 and residual data to the entropy decoder 460. Also, the controller 480 controls the motion vector decoder 420 to recover the motion vectors and the reference picture information and controls the entropy decoder 460 and the residual data decoder 470 to recover the residual data. The controller 480 also provides the motion vectors and reference picture of the decoding units to the motion compensator 450, to thereby control the recovery of the video information.

The video decoding apparatus according to an embodiment of the present invention may further include an intra compensator and a deblocking filter in compliance with H.264/AVC. Also, the residual data decoder 470 may further perform inverse DCT and dequantization on particular pictures (e.g. I pictures) as well as inverse DCT and dequantization of residual data based on H.264/AVC. Further, the video decoding apparatus according to the embodiment of the present invention may further recover coded video data in H.264/AVC as well as decode motion vectors according to the present invention.

A video recovery method using the motion vector information decoding method of the present invention will now be described.

Figure 8:
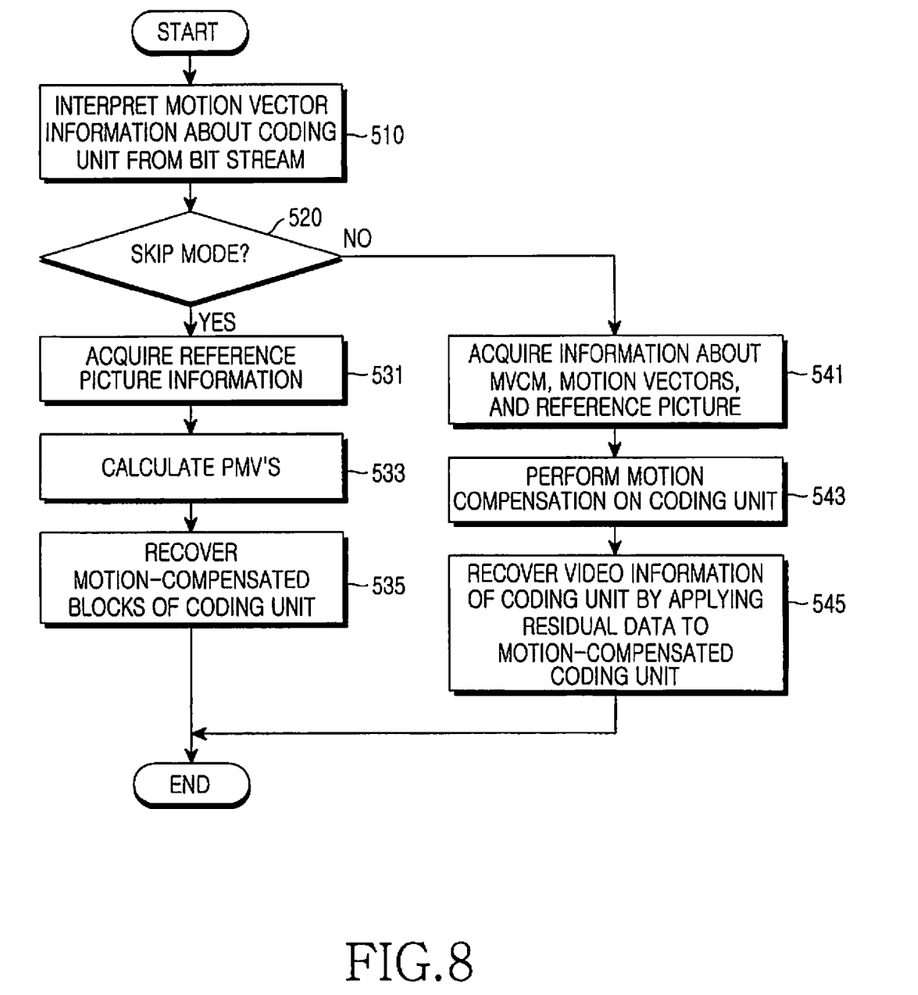
FIG. 8 is a flowchart illustrating a method for decoding motion vector information according to an embodiment of the present invention.

FIG. 8 is a flowchart illustrating a method for decoding motion vector information according to an embodiment of the present invention.

Referring to FIG. 8, the DEMUX receives a bit stream, acquires an MVCM ID from the received bit stream, and provides the MVCM ID to the controller 480 in step 510.

In step 520, the controller 480 determines whether the MVCM ID indicates extended SKIP.

The meaning of the extended SKIP mode is determined depending on a condition preset between the video encoder and the video decoder. Therefore, video is recovered on a coding unit basis according to the preset condition. The preset condition can be that the predicted motion vectors of subunits are identical to their motion vectors and the reference pictures of the motion vectors of the subunits are identical.

If the MVCM ID indicates extended SKIP in step 520, the motion vectors of the coding unit and the index of a reference picture are recovered based on the preset condition and motion compensation is performed by applying the motion vectors to the reference picture. For steps 531, 533 and 535, the controller 480 controls the motion compensator 450 and the reference picture memory 430. To be more specific, the controller 480 controls the reference picture memory 430 to provide the reference picture corresponding to the preset condition to the motion compensator 450 in step 531. When the controller 480 commands the motion estimator 440 to operate, the motion estimator 440 computes the predicted motion vectors of the subunits using the motion vectors of their neighboring subunits and provides the predicted motion vectors to the motion compensator 450 in step 533. The motion compensator 450 generates motion-compensated blocks of the coding unit by combining the predicted motion vectors with the reference picture, thus recovering video in step 535.

If the MVCM ID does not indicate extended SKIP in step 520, the controller 480 controls the operations of the motion vector decoder 420, the reference picture memory 430, the motion compensator 450, the entropy decoder 460, the residual data decoder 470, and the adder 475 in steps 541, 543 and 545.

The controller 480 commands the motion vector decoder 420 to operate and the motion vector decoder 420 recovers coded motion vectors and information indicating the reference picture of the motion vectors received from the DEMUX 410 and provides the recovered motion vectors and the reference information to the motion compensator 450 and the reference picture memory 430 in step 541.

In step 543, the controller 480 commands the motion compensator 450 to operate on the basis of a subunit of a size corresponding to the MVCM and the motion compensator 450 acquire video information by performing motion compensation on the coding unit through combination of the motion vectors and the reference picture.

In step 545, the controller 480 controls the operations of the entropy decoder 460, the residual data decoder 470, and the adder 475. Accordingly, the entropy decoder 460 decodes the entropy-coded residual data received from the DEMUX 410 and the residual data decoder 470 decodes the entropy-decoded residual data. The adder 475 recovers the final video information of the coding unit by combining the residual data with the motion-compensated video information.

In accordance with the embodiment of the present invention, the preset condition is that the PMVs of the subunits of a coding unit are applied to a predetermined reference picture and the resulting recovered video information is identical to the video information of the coding unit or has a minimum cost.

The reference picture can be the latest one stored in a frame memory. In this case, the preset condition can be set to be that the reference pictures of the PMVs are the picture temporally previous to a CP. If the preset condition is satisfied during encoding, only information indicating that the condition is satisfied is encoded. During decoding, the reference picture required for recovering the coding unit can be acquired without any additional information about the reference picture according to the preset condition.

The reference picture can be a picture stored in the reference picture memory. In this case, the preset condition can be that the reference pictures of the PMVs of the coding unit are a picture already coded or decoded. Therefore, if the preset condition is satisfied during coding, information indicating that the preset condition is satisfied and information indicating the location of the reference picture is periodically coded, for example, every slice, every picture, every Group Of Pictures (GOP), or every sequence. During decoding, a plurality of coding units can be recovered using periodically recovered reference pictures.

The present condition may vary for efficient coding and decoding.

As is apparent from the above description, the present invention advantageously reduces the amount of motion vector information effectively by encoding information indicating whether motion vector-related data satisfy a predetermined condition.

Also, the individual motion vectors of the subunits of a macro block can be indicated and motion vectors can be recovered on a subunit basis, simply by encoding information indicating the coded mode of the macro block without transmitting coded information about the motion vectors of the subunits.

Embodiments of the present invention can also be embodied as computer-readable codes on a computer-readable recording medium. The computer-readable recording medium is any data storage device that can store data which can thereafter be read by a computer system. Examples of the computer-readable recording medium include, but are not limited to, read-only memory (ROM), random-access memory (RAM), CD-ROMs, magnetic tapes, floppy disks, optical data storage devices, and carrier waves (such as data transmission through the Internet via wired or wireless transmission paths). The computer-readable recording medium can also be distributed over network-coupled computer systems so that the computer-readable code is stored and executed in a distributed fashion. Also, function programs, codes, and code segments for accomplishing the present invention can be easily construed as within the scope of the invention by programmers skilled in the art to which the present invention pertains.

While the invention has been shown and described with reference to certain exemplary embodiments of the present invention thereof, it will be understood by those skilled in the art that various changes in form and details may be made therein without departing from the spirit and scope of the present invention as defined by the appended claims and their equivalents.

What is claimed is:

1. A method for encoding motion vector information of a coding unit, comprising:
dividing the coding unit into a plurality of subunits and calculating Predictive Motion Vectors (PMVs) of the plurality of subunits in a plurality of Motion Vector Predictive Modes (MVPMs);
recovering video information of the coding unit by applying the PMVs to a plurality of reference pictures;
calculating residual data between the recovered video information and original video information of the coding unit;
encoding and decoding the residual data;
generating re-recovered video information by applying the encoded and decoded residual data to the recovered video information;
calculating a cost between the re-recovered video information and the original video information;
selecting an MVPM with a minimum cost;
setting the minimum cost as a first cost;
recovering the video information of the coding unit by applying the PMVs to a single reference picture;
calculating a second cost between the recovered video information and the original video information;
determining if the PMVs satisfy a predetermined condition;
if the PMVs satisfy the predetermined condition, generating a first coded bit stream comprising only a Motion Vector Coding Mode (MVCM) Identifier (ID), indicating that motion vectors of the plurality of subunits and information about the single reference picture are omitted in the first coded bit stream;
if the PMVs do not satisfy the predetermined condition, generating a second coded bit stream comprising an MVCM ID, indicating that the motion vectors of the plurality of subunits are included in the second coded bit stream, information about the plurality of reference pictures, and the motion vectors of the plurality of subunits; and
transmitting the first coded bit stream or the second coded bit stream to a video decoding apparatus,
wherein the predetermined condition is that the second cost is less than the first cost and the PMVs of the plurality of subunits are equal to the motion vectors of the plurality of subunits.

2. The method of claim 1, wherein, if the PMVs do not satisfy the predetermined condition, the second coded bit stream further comprises residual data associated with the motion vectors of the plurality of subunits.

3. The method of claim 1, wherein the reference picture is a picture neighboring a current picture being encoded.

4. The method of claim 1, wherein the reference picture is selected from pictures stored in a frame memory.

5. The method of claim 1, wherein the PMV calculation comprises:
acquiring motion vectors of neighboring subunits for each subunit; and
calculating the PMV of each subunit by calculating a median value of the motion vectors of the neighboring subunits.

6. An apparatus for encoding motion vector information about a coding unit using a motion estimator and a motion compensator, the apparatus comprising:
means for recovering video information of the coding unit by applying Predictive Motion Vectors (PMVs) to a plurality of reference pictures;
means for calculating residual data between the recovered video information and original video information of the coding unit, and encoding and decoding the residual data;
means for generating re-recovered video information by applying the encoded and decoded residual data to the recovered video information;
means for calculating a cost between the re-recovered video information and the original video information;
means for selecting a Motion Vector Predictive Mode (MVPM) with a minimum cost and setting the minimum cost as a first cost;
means for recovering the video information of the coding unit by applying the PMVs to a single reference picture and calculating a second cost between the recovered video information and the original video information;
means for determining if the PMVs satisfy a predetermined condition;
means for generating a first coded bit stream including only a Motion Vector Coding Mode (MVCM) Identifier (ID) indicating that motion vectors of the plurality of subunits and information about the single reference picture are omitted from the first coded bit stream, if the PMVs satisfy the predetermined condition;
means for generating a second coded bit stream including an MVCM ID indicating that the motion vectors of the plurality of subunits are included in the second coded bit stream, information about the plurality of reference pictures, and the motion vectors of the plurality of subunits, if the PMVs do not satisfy the predetermined condition; and
means for transmitting the first coded bit stream or the second coded bit stream to a video decoding apparatus,
wherein the predetermined condition is that the second cost is less than the first cost and the PMVs of the plurality of subunits are equal to the motion vectors of the plurality of subunits.

7. The apparatus of claim 6, wherein, if the PMVs do not satisfy the predetermined condition, the second coded bit stream further comprises residual data associated with the motion vectors of the subunits.

8. The apparatus of claim 6, wherein the reference picture is a picture neighboring a current picture being encoded.

9. The apparatus of claim 6, wherein the reference picture is selected from pictures stored in a frame memory.

10. The apparatus of claim 6, wherein the PMV of each subunit is a median value of motion vectors of neighboring subunits for each subunit.

* * * * *